April 8, 1952 E. J. HERBENAR 2,592,280
CONNECTOR
Filed April 14, 1951
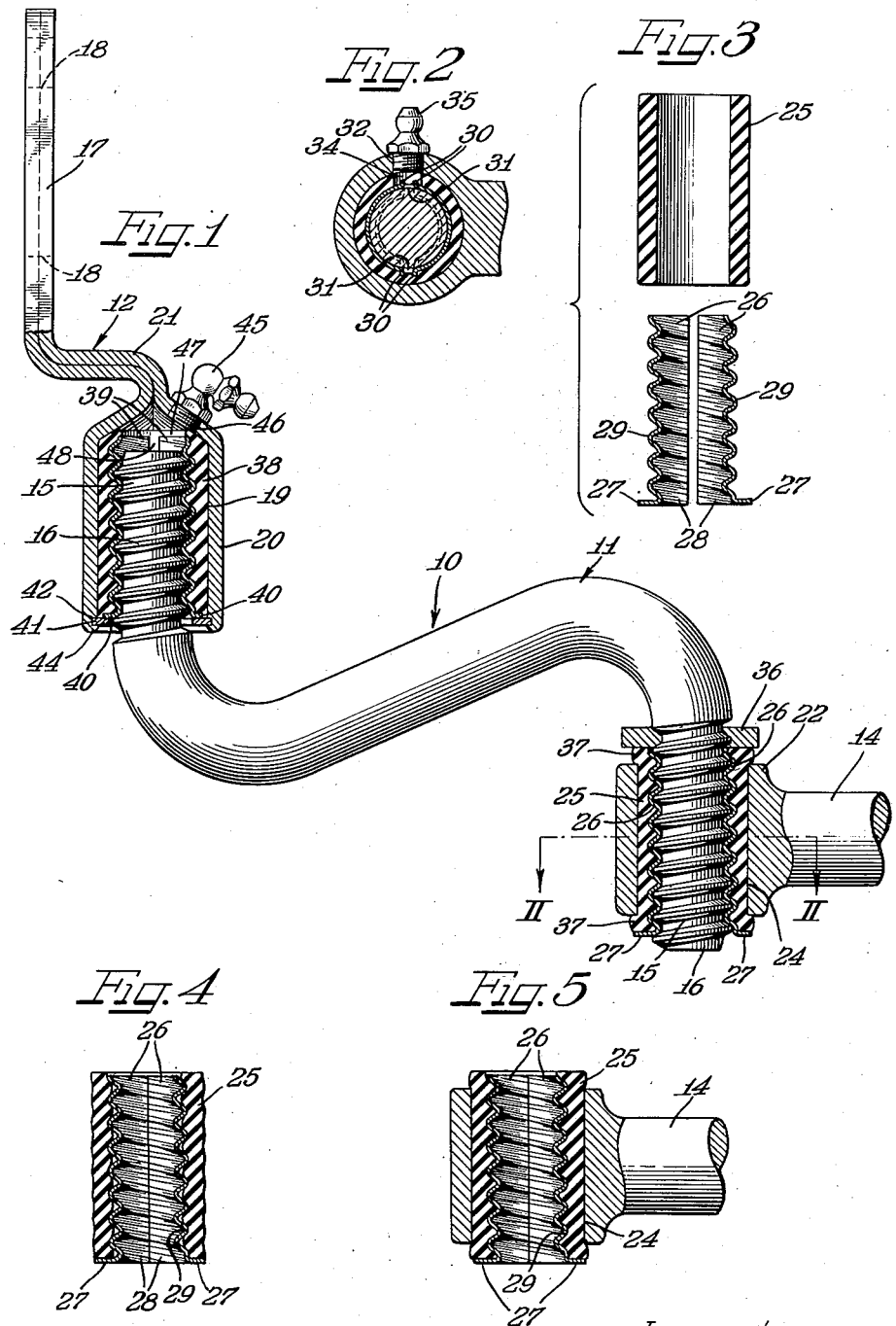
Inventor
Edward John Herbenar Patented Apr. 8, 1952

2,592,280

UNITED STATES PATENT OFFICE 2,592,280

CONNECTOR

Edward J. Herbenar, Detroit, Mich., assignor to Thompson Products, Inc., Cleveland, Ohio, a corporation of Ohio Application April 14, 1951, Serial No. 221,074

9 Claims. (Cl. 74—579)

1

This invention relates to an improved linkage assembly, and more particularly, to a simplified and improved idler arm assembly for use in an automotive steering linkage for pivotally connecting the steering center link thereof to the automobile frame.

While the invention is described as used in an automotive steering linkage, it will be evident from the explanation that the principles are generally applicable to pivot linkages.

In an automotive steering linkage an idler arm is ordinarily used for pivotally connecting one end of the transversely extending steering center link to the vehicle frame while the other end is operatively connected to the pitman arm which, in turn, is actuated by the steering box or actuator. The idler arm is subjected to a substantial amount of abuse due mainly to the almost constant vibratory movement of the road wheels, and therefore it is desirable to provide an idler arm assembly which will absorb a substantial amount of road shock without introducing undue friction into the steering linkage. In addition, in the interest of low maintenance cost, it is important that the mating bearing surfaces of the idler arm assembly be long-wearing.

According to the present invention, the idler arm is formed from rod stock bent into a generally X-shaped configuration with externally threaded parallel end portions. The threaded end portions are received in threaded engagement between respective pairs of hardened semi-annular sheet metal bearing liners, urging the liners apart to impress the outer thread embossments into a resilient bushing formed of rubber or the like. The bushings are pressed into respective cylindrical apertures in a center link end portion and a frame bracket end. The frame bracket is fixedly secured to an automobile frame while the center link is pivotally connected at its other end to a pitman steering arm. Longitudinally edge flanges are formed on the spaced liners and provide lubricant channels therebetween to receive grease or the like introduced into the apertures through conventional grease fittings for lubricating the abutting surfaces of the liners and the rod ends. The invention provides a lubricated resilient mounting for an idler arm to absorb road shock and to provide automatic adjustment between the mating bearing surfaces.

It is, therefore, an object of the present invention to provide an improved linkage assembly.

Another object of the invention is to provide

2 a simplified and easily produced idler arm assembly for the steering linkage in an automobile, or the like.

A further object of the invention is to provide a resilient steering arm mounting including rubber-like bushings for absorbing shock loading and for supplying automatic wear take-up means between the mating bearing surfaces.

Still another object of the present invention is to provide a simplified and long wearing linkage assembly including metallic bearing liners about a rod end portion which engage a resilient bushing to retain the liners in bearing relation.

A specific object of the invention is to provide an easily assembled idler arm in an automotive steering linkage including a rod with screw threads formed on the end portions and respective pairs of bearing shells disposed in conforming relation about the end portions with the outer surfaces of the shells impressed into rubber-like bushings which are retained in cylindrical apertures in a frame bracket and a tie rod center link boss.

Other objects, features and advantages of the present invention will be apparent from the following detailed description of one embodiment, by way of preferred example only, taken in conjunction with the accompanying drawings.

On the drawings:

Figure 1 is a sectional view, with parts in elevation, of an idler arm assembly according to this invention with a fragment of the tie rod center link shown;

Figure 2 is a fragmentary sectional view taken along the line II—II of Figure 1 and showing the lubrication arrangement in the point connecting the center link to the idler arm;

Figure 3 is an exploded sectional view of a resilient bushing and the associated metal bearing shells;

Figure 4 is a sectional view showing the shells inserted into the resilient bushing; and Figure 5 is a fragmentary sectional view of the end portion of the center link with the bushing and the shells inserted therein without the idler arm.

As shown on the drawings:

In Figure 1 is shown a linkage or idler arm assembly 10 for use in the steering linkage of an automobile or the like and including an idler arm 11 pivotally connected to a frame bracket 12 and to a steering center link 14. When assembled in the automobile the frame bracket 12 is fixedly secured to a frame (not shown), and the center link 14 is pivotally connected at its other end to a pitman arm (not shown) which is actuated by a steering box or actuator (not shown) in the conventional manner to steer the front wheels (not shown) of the automobile through a pair of pivotally connected tie rods (not shown).

The idler arm 11 is formed of round rod stock and bent into a substantially Z-shaped configuration with two parallel end portions 15, 15 having relatively coarse screw threads 16, 16 formed externally thereon.

The frame bracket 12 has a flat attachment portion 17 with a pair of pin-receiving apertures 18, 18 therethrough. An end socket or cylindrical aperture 19 is formed in the opposite end portion with the attachment portion 17 axially offset and connected thereto by means of a flat integral center portion 21. The bracket can be expeditiously formed by flattening portions of a tube to form the attachment portion 17 and the central portion 21 while retaining the socket portion 21 in its original tubular form.

The center link 14 has an integral end boss 22 with a transverse cylindrical aperture 24 formed therethrough.

In order to pivotally connect one end portion of the idler arm 11 to the center link 14, an annular cylindrical resilient sleeve or bushing 25, formed of rubber, plastic or the like, has a pair of substantially semi-annular sheet metal shell liners or bearing elements 26, 26 inserted therein and substantially coextensive in length therewith. Integral radially outwardly extending semi-annular end flanges 27, 27 abut one end edge of the bushing 25 to axially space the shells therein with the upper ends short of the end of the bushing. Internal thread impressions 28, 28 of proper size to mate with the threads 16, are impressed in the shells as by stamping to form external generally semi-annular embossments 29. As shown in Figure 4, the major external diameter of the abutted pair of liners 26 is greater than the internal diameter of the bushing 25 so that the embossments 29 are partially imbedded in the internal surface of the bushing. Radially outwardly extending flanges 30 are formed along the longitudinal edges of each of the shells 26.

The bushing and shell assembly shown in Figure 4 is pressed into the cylindrical aperture 24 as shown in Figure 5 with the ends of the bushing 25 extending out of each end of the aperture. It will be noted that the walls of the aperture 24 compress the bushing 25 inwardly about the shell liners 26 to further impress the external embossments 29 into the interior surface of the bushing.

The pitch diameter of the internal threads 28 is somewhat smaller than the pitch diameter of threads 16 when the longitudinal edges of the shells 26 are abutted as shown in Figures 4 and 5. Therefore, when one end portion 15 of the idler arm 11 is threadedly inserted between the liners 26, they are urged radially outwardly to further compress the resilient bushing between the liner and the wall of the aperture 24. Thus, longitudinal channels 31, 31 (Fig. 2) are formed between the spaced longitudinal flanges 30.

Aligned apertures 32 and 34 are formed through the boss 22 and the bushing 25, respectively, and a lubricant fitting 35 is threadedly inserted into the aperture 32. It will be noted that the lubricant fitting 35 communicates through the aperture 34 with one of the channels 31 to allow the introduction of lubricant thereinto to insure proper lubrication between the external threads 16 and the internal threads 28 to insure free pivoting between the idler arm 11 and the center link 14.

A threaded retainer washer 36 is provided at the inner end of the threads 16 and abuts the upper end of the bushing 25.

It will be noted that there is no metal-to-metal contact of the idler arm 11 and the center link 14, and expanded annular beads 37 of bushing material are formed between the ends of the boss 22 and the opposing flanges 27 and washer 36. Hence, the idler arm and the center link are resiliently pivotally connected and the compression on the bushing 25 provides automatic wear take-up means or adjustment means between the threaded bearing surfaces 16 and 28.

As a safety precaution, the diameter of the combined flanges 27 is greater than that of the cylindrical aperture 24 so that in case of failure of the bushing 25, the end of the center link 14 will not become disengaged from the idler arm.

The connection between the other end of the idler arm 11 and the frame bracket 12 is formed in a similar manner. In this connection, a resilient bushing 38 and a pair of shell liners or bearing elements 39 are retained in the aperture or socket 19. The bushing 38 may be identical to the bushing 25 except for the elimination of the aperture 34, and the shells 39 may be identical to the shells 26 except for the formation of end flanges 40, 40 of smaller diameter than the flanges 27 in order not to interfere with the wall of the aperture 19. The bushings and the shells are completely contained within the aperture 19. The bushings are retained by being compressed therein and also by means of a retaining washer 41 which is inserted into an annular end groove 42 and fixedly secured therein by spinning or peening the end of the socket portion 20 inwardly thereabout at 44.

For introducing lubricant into the socket 19 a lubricant fitting 45 is threadedly inserted into a threaded aperture 46 formed through the upper portion of the socket portion 20 and communicates with a lubricant chamber 47 with longitudinal lubricant channels 48, similar to the channels 31.

To prevent binding between the threaded ends of the idler arm 11 and the asociated bracket or center link, the leads of the threads 16 are identical so that when the idler arm pivots in one direction, the thread leads will move the arm equally upwardly at both ends and vice versa when pivoted in the other direction.

In order to increase the useful life of the bearing surfaces, the external threads 16 and the internal threads of the shell liners may be as hardened.

From the above description it will be readily understood that the present invention provides an improved idler arm or linkage assembly for the steering linkage of an automotive vehicle. The two threaded ends of the idler arm are pivotally and resiliently retained in rubber-like bushings with respective pairs of shell liners between the arm threads and the bushings and with the bushings retained in apertures in a frame bracket and a center link boss, respectively. The resultant assembly absorbs road shock and provides automatic adjustment between the wearing surfaces while affording lubricant channels between the opposed edges of the shell liners.

It will be understood that modifications and variations may be effected without departing from the scope of the novel concepts of the present invention.

I claim as my invention:

1. In an automotive steering linkage including a steering center link having an apertured boss at one end, an idler arm for pivotally connecting said center link to an automobile frame, comprising a rod having a central portion and parallel externally threaded case hardened end portions at an angle to the central portion, a pair of half-round hardened bearing shells disposed in generally conforming bearing relation about each of said rod threaded end portions, said shells having integral radially outwardly extending longitudinal edge flanges in opposed spaced relation defining longitudinal channels therebetween, a rubber-like bushing disposed in resilient retaining relation about each pair of bearing shells, a tubular frame bracket having a flattened attachment portion at one end and an open bottom housing portion at the other end, said housing portion and said center link apertured boss receiving the respective bushings in substantially conforming compressed relation, and means for introducing lubricant into said channels, whereby said bushings absorb shock between the center link and the automobile frame and provide automatic wear take-up means between the mating bearing surfaces.

2. In an automotive steering linkage including a center link having an apertured boss at one end, an idler arm for pivotally connecting said center link to an automobile frame, comprising a rod having parallel externally threaded hardened end portions, a pair of hardened semi-annular shells disposed in generally conforming bearing relation about each of said rod threaded end portions with longitudinal edge clearances between the shells in each pair, a resilient rubber-like sleeve stretched over each pair of shells, a frame attachment bracket having an open-ended housing portion at one end, means fixedly securing said bracket to the automobile frame, said housing portion and said center link apertured boss retaining the respective sleeves in compressed relation to pivotally connect the rod to the bracket and the center link, respectively, whereby said sleeves absorb shock between the center link and the automobile frame and provide automatic wear take-up means between the mating bearing surfaces.

3. A linkage assembly comprising a link having a cylindrical aperture in one end portion, a bracket having a cylindrical aperture in one end portion, a resilient rubber-like bushing compressed into each of said apertures, a pair of half-round bearing shells disposed in each bushing, said shells having screw thread impressions pressed therein forming outer embossments, and a rod having externally threaded end portions threadedly engaged in pivotal relation in the respective pairs of shells and urging the shells in each pair apart to impress the outer embossments into said bushings, whereby said bushings absorb shock loading between the link and the bracket and provide automatic adjustment between the shells and the rod ends.

4. A linkage assembly comprising a link having a cylindrical aperture therein, a rubber-like bushing disposed in substantially conforming relation in said aperture, a pair of hardened sheet metal semi-annular bearing liners disposed in said bushing, said liners having screw threads pressed therein forming outer embossments, a rod having a threaded portion disposed in conforming bearing relation between said liners and urging the liners radially outwardly into conforming engagement with said bushing, whereby said link and said rod are pivotally connected with the bushing absorbing shock therebetween and automatically compensating for wear between the liners and the rod threaded portion.

5. A linkage assembly comprising a link having a cylindrical aperture therein, a pliable resilient bushing disposed in conforming relation in said aperture, a pair of substantially semi-annular bearing elements disposed in said bushing, said elements having generally semi-annular grooves formed in the inner surfaces thereof and generally semi-annular embossments formed in the outer surfaces thereof, a rod having a portion with generally annular alternate grooves and embossments formed thereon with said portion disposed in substantially conforming relation with the inner surfaces of said elements, said rod portion forcing said elements apart to impress the outer embossments into the inner surface of said bushing and to form a longitudinal channel between opposed edges of the elements, and means for introducing lubricant into said channel, whereby said link and said rod are resiliently pivotally connected.

6. A linkage assembly comprising a first member having a portion with generally annular grooves formed thereon, a pair of substantially semi-annular bearing elements disposed in generally conforming relation about said first member portion, a resilient sleeve in stretched relation about said elements, and a second member having an aperture receiving said sleeve in retained relation, whereby said first member and said second member are resiliently pivotally connected.

7. A linkage assembly comprising a first member having an aperture therein, a rubber-like bushing disposed in substantially conforming relation in said aperture, a sheet metal liner disposed in said bushing, said liner having generally radially extending grooves in the inner surface thereof forming outer surface embossments, a second member having a portion with radial embossments thereon disposed in conforming bearing relation against the inner surface of said liner and urging the outer surface thereof outwardly to impress the liner embossments into the bushing, whereby said first member and said second member are resiliently pivotally connected.

8. A linkage assembly comprising a bracket having a flat attachment portion and an offset tubular end portion providing a cylindrical socket with an open end, a resilient bushing in said socket, a pair of opposed semi-cylindrical bearing liners disposed in said bushing, said liners having embossments defining inner screw threads and outer convolutions, an arm having a threaded end portion threaded in said liners and urging the liners radially outwardly into loaded conforming engagement with said bushing, and a retainer secured in the open end of the socket overlying the end of the bushing whereby said bracket and said arm are pivotally connected with the bushing absorbing shock therebetween and automatically compensating for wear between the liners and the threaded end portion of the arm.

9. An idler arm assembly for an automotive steering linkage comprising a bracket having a flat attachment portion and a depending axially offset cylindrical portion with an open bottom, a resilient bushing in said cylindrical portion, a pair of opposed metal bearing elements lining said bushing, said element having internal grooves and external projections, an idler arm having an end portion with projections in substantially conforming relation with the inner grooved surfaces of said elements, said end portion of the arm forcing said elements apart to impress the outer projections thereon into the inner surface of said bushing and to form a longitudinal channel between opposed edges of the elements, means at the open bottom of the cylindrical portion retaining said bushing in said portion, and means for introducing lubricant into said channel, whereby said bracket and said arm are resiliently pivotally connected.

EDWARD J. HERBENAR.

REFERENCES CITED

The following references are of record in the file of this patent:

UNITED STATES PATENTS

| Number | Name | Date |
|---|---|---|
| 688,785 | Knight | Dec. 10, 1901 |
| 1,827,267 | Short | Oct. 13, 1931 |